United States Patent
Szlag

(10) Patent No.: US 10,625,638 B2
(45) Date of Patent: Apr. 21, 2020

(54) EASY-ENTRY ADJUSTMENT MECHANISM FOR DIVE-DOWN VEHICLE SEATS OR SEAT SYSTEMS

(71) Applicant: Volkswagen Aktiengesellschaft, Wolfsburg (DE)

(72) Inventor: Robert Szlag, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/210,588

(22) Filed: Dec. 5, 2018

(65) Prior Publication Data

US 2019/0106026 A1 Apr. 11, 2019

Related U.S. Application Data

(63) Continuation of application No. 15/044,550, filed on Feb. 16, 2016, now Pat. No. 10,173,555, which is a
(Continued)

(30) Foreign Application Priority Data

Aug. 14, 2013 (DE) .......... 10 2013 012 284

(51) Int. Cl.
*B60N 2/30* (2006.01)
*B60N 2/06* (2006.01)
(Continued)

(52) U.S. Cl.
CPC .......... *B60N 2/3065* (2013.01); *B60N 2/065* (2013.01); *B60N 2/0722* (2013.01); *B60N 2/12* (2013.01)

(58) Field of Classification Search
None
See application file for complete search history.

(56) References Cited

U.S. PATENT DOCUMENTS

| 4,652,052 A * | 3/1987 | Hessler | B60N 2/123 248/430 |
| 5,137,331 A * | 8/1992 | Colozza | B60N 2/123 248/430 |

(Continued)

FOREIGN PATENT DOCUMENTS

| CN | 2723265 Y | 9/2005 |
| CN | 2723266 Y | 9/2005 |

(Continued)

OTHER PUBLICATIONS

Chinese Office Action for Chinese Application No. 201480044304.6 dated Nov. 4, 2016 with English translation.

(Continued)

*Primary Examiner* — David E Allred
(74) *Attorney, Agent, or Firm* — Muncy, Geissler, Olds & Lowe, P.C.

(57) ABSTRACT

An adjustment mechanism, in particular easy-entry adjustment mechanism of a vehicle seat or a vehicle seat within a multi-part seat bench or an undivided seat bench, in particular for easier entry to an interior of a motor vehicle, wherein, for carrying out a first step, the backrest part of the vehicle seat/of the seat bench has a backrest unlocking unit, by means of which the backrest part of the vehicle seat/of the seat bench is unlockable and moveable in relation to the seat part of the vehicle seat/of the seat bench into a predeterminable folded position coming closer to the seat part. In a second adjustment movement following a first adjustment movement, the vehicle seat/the seat bench is further movable on the seat rail in the same direction by a further horizontal second adjustment distance.

5 Claims, 7 Drawing Sheets

Related U.S. Application Data continuation of application No. PCT/EP2014/066965, filed on Aug. 7, 2014.

(51) Int. Cl.
*B60N 2/07* (2006.01)
*B60N 2/12* (2006.01)

(56) References Cited

U.S. PATENT DOCUMENTS

| | | | |
|---|---|---|---|
| 6,152,533 | A | 11/2000 | Smuk |
| 7,059,679 | B2 | 6/2006 | Yamada |
| 7,267,317 | B2 | 9/2007 | Kato et al. |
| 7,686,397 | B2 | 3/2010 | Sahi |
| 8,047,610 | B2 | 11/2011 | Yamagishi |
| 8,556,348 | B2 | 10/2013 | Glaser et al. |
| 8,602,495 | B2 | 12/2013 | Jeong et al. |
| 9,156,376 | B2 * | 10/2015 | Yamada .................. B60N 2/08 |
| 2004/0100114 | A1 | 5/2004 | Rhodes et al. |
| 2007/0246985 | A1 | 10/2007 | Sahi |
| 2009/0058169 | A1 * | 3/2009 | Soga .................. B60N 2/0705 |
| | | | 297/463.1 |
| 2010/0084903 | A1 | 4/2010 | Kämmerer |
| 2010/0244524 | A1 | 9/2010 | Kumazaki et al. |
| 2011/0233369 | A1 * | 9/2011 | Nihonmatsu ........ B60N 2/0705 |
| | | | 248/429 |
| 2013/0147248 | A1 | 6/2013 | Wolf et al. |
| 2013/0214113 | A1 | 8/2013 | Kume et al. |
| 2014/0110553 | A1 | 4/2014 | Hoshihara et al. |
| 2018/0141467 | A1 * | 5/2018 | Goto .................. B60N 2/123 |
| 2018/0141468 | A1 * | 5/2018 | Goto .................. B60N 2/0887 |

FOREIGN PATENT DOCUMENTS

| | | |
|---|---|---|
| CN | 103085692 A | 5/2013 |
| DE | 10 2004 042 038 A1 | 3/2006 |
| DE | 11 2005 001 993 T5 | 7/2007 |
| DE | 10 2007 053 963 A1 | 8/2008 |
| DE | 198 82 413 B4 | 12/2008 |
| DE | 10 2007 036 450 B3 | 1/2009 |
| DE | 10 2008 063 617 A1 | 7/2009 |
| DE | 20 2009 006 984 U1 | 8/2009 |
| DE | 10 2008 019 527 A1 | 11/2009 |
| DE | 10 2008 050 468 B3 | 4/2010 |
| DE | 10 2009 010 226 A1 | 8/2010 |
| DE | 11 2008 003 251 T5 | 9/2010 |
| DE | 10 2011 055 755 A1 | 6/2012 |
| DE | 10 2011 107 226 A1 | 1/2013 |
| EP | 1 500 550 A2 | 1/2005 |
| JP | 2005-239050 A | 9/2005 |
| JP | 2006-142923 A | 6/2006 |
| JP | 2010125917 A * | 6/2010 |
| JP | 5189944 B2 * | 4/2013 |
| JP | 5276418 B2 * | 8/2013 |
| WO | WO 2008/012364 A1 | 1/2008 |
| WO | WO 2010/083607 A1 | 7/2010 |

OTHER PUBLICATIONS

Korean Office Action for Korean Application No. 10-2016-7006594 dated May 31, 2017 with English translation.

* cited by examiner

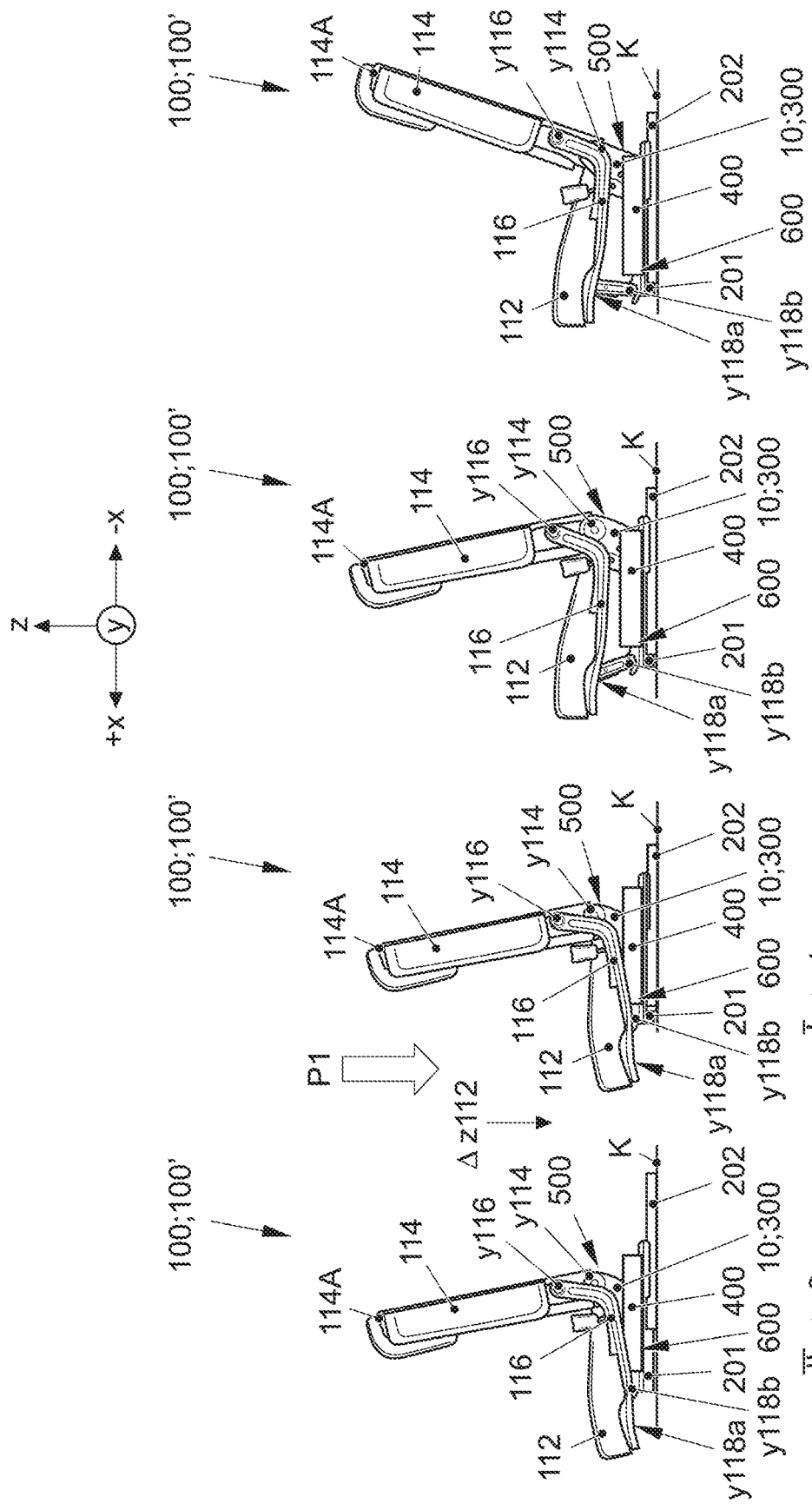

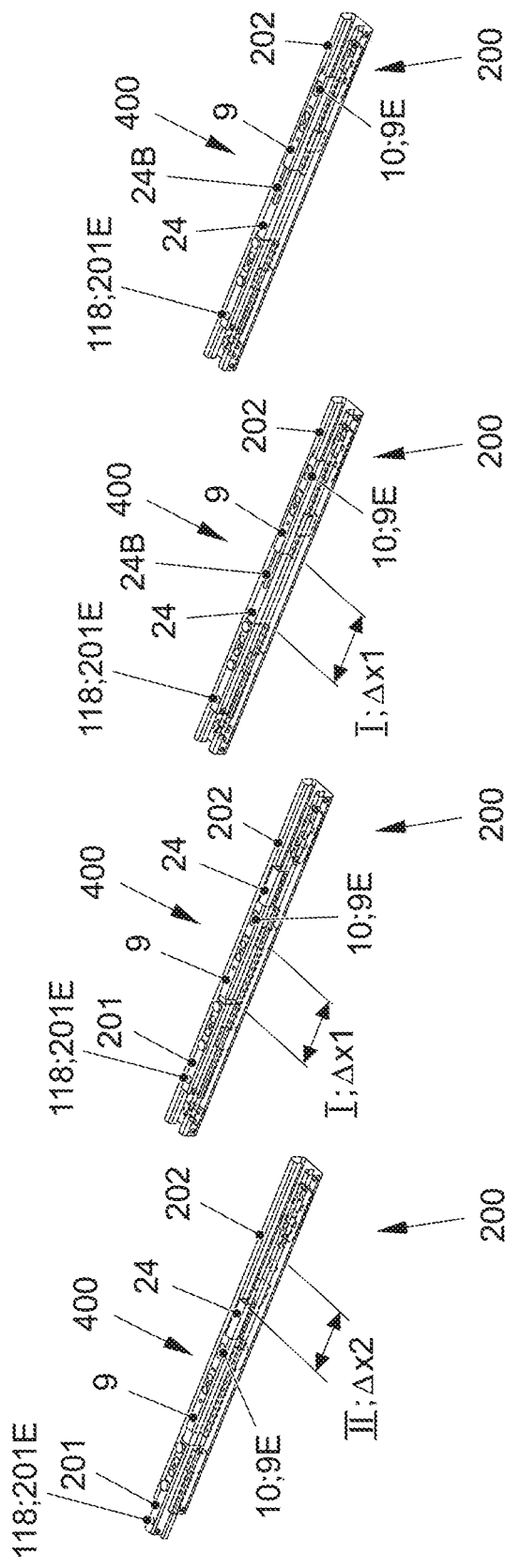

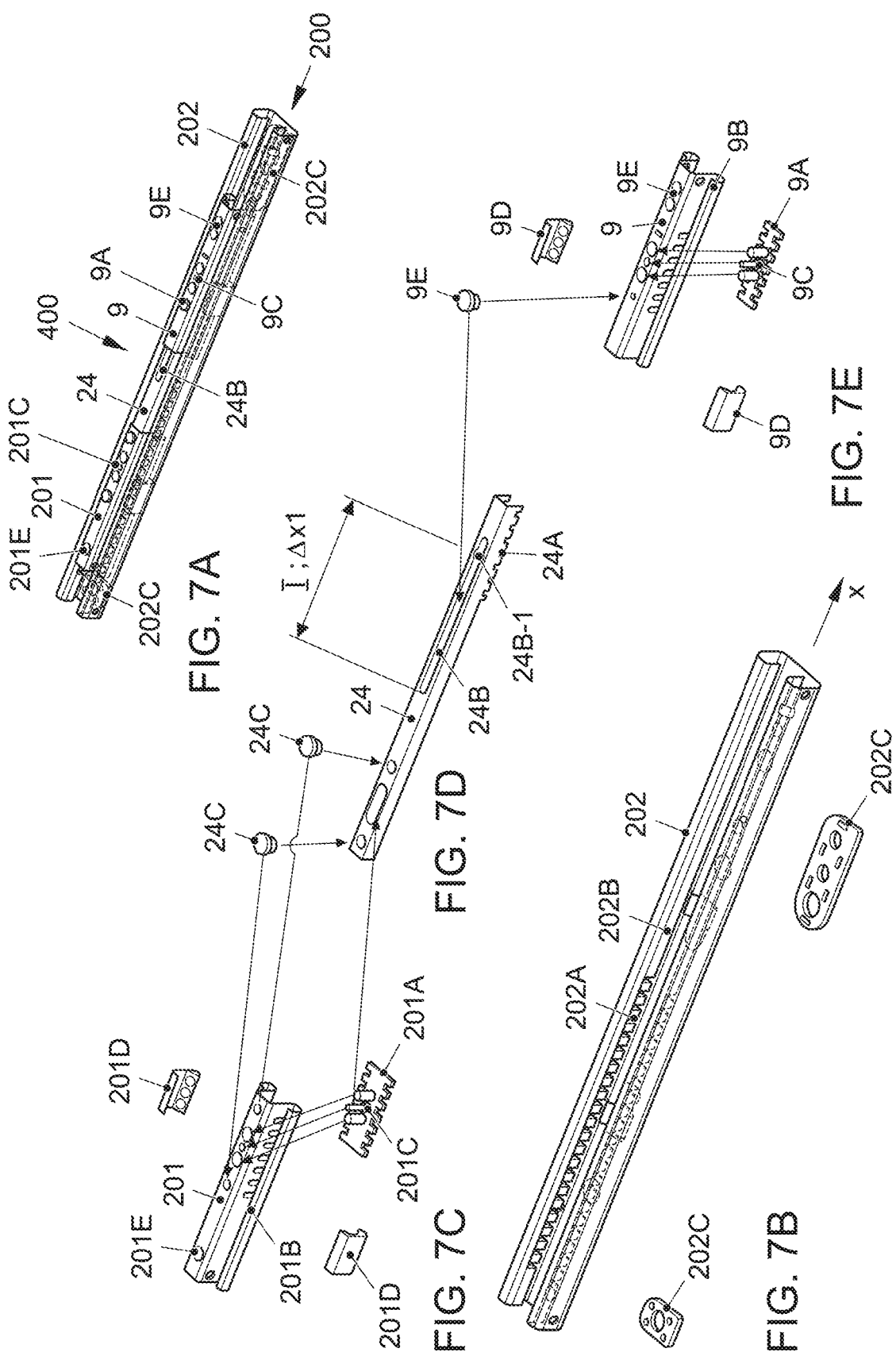

EASY-ENTRY ADJUSTMENT MECHANISM FOR DIVE-DOWN VEHICLE SEATS OR SEAT SYSTEMS

This nonprovisional application is a continuation of U.S. application Ser. No. 15/044,550, which was filed on Feb. 16, 2016, which is a continuation of International Application No. PCT/EP2014/066965, which was filed on Aug. 7, 2014, and which claims priority to German Patent Application No. 10 2013 012 284.8, which was filed in Germany on Aug. 14, 2013, and which are all herein incorporated by reference.

BACKGROUND OF THE INVENTION

Field of the Invention

The invention relates to an adjustment mechanism, in particular, an easy-entry adjustment of a vehicle seat or a vehicle seat within a multi-part seat bench or an undivided seat bench and the associated adjustment kinematics.

Description of the Background Art

The publication DE 2008 050 468 B3 (US 2010/0084903 A1) discloses a vehicle seat, which can be pivoted forward from a position suitable for passenger transport into at least one non-use position. The vehicle seat comprises a base and at least one rocker which is at least indirectly linked on the base, in particular on a base attached to the front foot. Furthermore, a seat cushion is arranged, which is linked to the rocker. In addition, at least one link is designed that is at least indirectly linked on the base, in particular on the front foot mounted on the base. The vehicle seat further comprises a back foot, which is also linked at the at least one link and is releasably locked to the base. A backrest is linked to the rear foot around a back pivot axis. The seat cushion is directly linked to the backrest by means of a joint.

The connection created by a plurality of links between the rear foot and the base, preferably by forming a four-bar linkage, allows for better utilization of the pivot angle range with shorter rockers as compared to a direct linkage of the rear foot at the base.

The publication DE 10 2007 036 450 primarily describes a similarly constructed vehicle seat with an inevitable rail release. The vehicle seat also includes a seat rail pair by means of which the seat longitudinal position is adjustable, and which can be locked by means of a rail lock. It describes the at least one front foot attached to the seat rail pair and the seat cushion, which is linked at least indirectly to the seat rail pair, in particular by at least one front rocker on the front foot, and in contrast to publication DE 10 2008 050 468 B3, describes at least one rear foot releasably connectable to the seat rail pair, which is linked at least indirectly on the seat rail pair, in particular to the front foot, by means of at least one link, and a backrest linked to the rear foot. The vehicle seat, which can at least be moved from the at least one position suitable for passenger transport into at least one non-use position, inevitably acts in an unlocking manner on the rail release of at least one of the thereby moving parts during transition from the use position into the non-use position.

Another kinematic solution for the folding of a vehicle seat from a position suitable for passenger transport into a loading position not suitable for carrying passengers is outlined in the publication DE 10 2007 053 963 A1. In this vehicle seat, a four-bar mechanism is formed by pivot joints. The vehicle seat comprises a backrest, a seat part, a floor console and an articulated arm, with the backrest and the floor console having a first pivot joint, the floor console and the articulated arm another, second pivot joint, the articulated arm and the seat part a further, third pivot joint, and the seat part and backrest a further, fourth pivot joint in such a way, that the seat part, the floor console, the articulated arm and a portion of the backrest, which is delimited by the first and the fourth pivot joint, form the four-bar linkage mechanism.

The publication DE 11 2008 003 251 T5 (US 2010/0244524 A1) discloses a vehicle seat with a downward tilt function for lowering a seat cushion in conjunction with a farthest-tilt movement, in which a backrest is tilted downward-forward, and with an entry function for a configuration under a certain condition, in which a seat body slides forward, with respect to a vehicle floor, in conjunction with a semi-tilt motion, in which the backrest is tilted to a forward-tilted position.

Another vehicle seat deserves to be mentioned, which as described in the publication DE 198 82 413 B4, makes it possible to operate the easy-entry with a single controller along with a lowering of the seating option in conjunction with an independent control of a seat reclining device.

The function of moving a vehicle seat or seat system formed by several vehicle seats from the appropriate passenger transport position into a position non-suitable for passenger transport, in particular into a loading position, is also called a "dive-down" function. The associated seat systems are analogously referred to as "dive-down" seat systems because they descend in a space saving manner from the passenger use position to a non-use position.

SUMMARY OF THE INVENTION

It is therefore an object of the invention to provide an adjustment mechanism with adjustment kinematics that provides an individual with a large entry area when boarding the interior of a vehicle, in particular a second and third row of seats.

In an exemplary embodiment, an adjustment mechanism is provided, in particular an easy-entry adjustment mechanism of a vehicle seat or a vehicle seat within a multi-part seat bench or an undivided seat bench, in particular for facilitating entry into the interior of a motor vehicle, the backrest part of the vehicle seat/of the seat bench having a backrest unlocking unit for carrying out a first step through which the backrest part of the vehicle seat/of the seat bench can be unlocked and can be brought into a predeterminable folding position moving closer to the seat part, relative to the vehicle seat/the seat bench.

According to an exemplary embodiment of the invention, the backrest unlocking unit for carrying out a second step in which a first adjustment movement of the vehicle seat/of the seat bench is performed, acts in an unlocking manner on a slide unlocking unit of the slide carrying the vehicle seat/the seat bench, in the folded position of the vehicle seat/of the seat bench, so that the vehicle seat/the seat bench is horizontally displaced by a first adjustment distance by means of the slide, and the seat part is moved vertically downwards via at least one pivoting arm arranged in the front region of the seat part within the first adjustment movement, in each case by a predeterminable vertical adjustment distance. The slide then acts in an unlocking manner on a seat rail unlocking unit of a seat rail supporting the slide, so that the vehicle seat/the seat bench can be further moved on the seat rail in a third step, after the first adjustment, rectified in a second adjustment, by a further horizontal, second adjustment distance.

The easy-entry adjustment kinematics for a vehicle seat or a vehicle seat within a multi-part seat bench or for an undivided seat bench, in particular for facilitating entry into an interior of a motor vehicle, provides in a first step, a back portion of the vehicle seat/of the seat bench is unlocked and brought into a predeterminable folded position moving closer to the seat part, relative to the seat part of the vehicle seat/of the seat bench, and in a second step, a first adjustment movement of the vehicle seat/of the seat bench is carried out, in which the vehicle seat/the seat bench is horizontally displaced along a first adjustment distance and the seat part is moved vertically downward within the first adjustment movement by, in each case, a predeterminable vertical adjustment distance, after which the vehicle seat/the seat bench, and in a third step, after the first adjustment movement, is moved to another horizontal second adjustment distance, rectified in a second adjustment.

According to an embodiment of the invention, the known kinematics of the easy-entry function are coupled with the kinematics of the dive-down function. Consequently, the present invention advantageously allows easier entry into the interior of a vehicle, and more particularly into a row of seats situated behind the vehicle seat/the seat bench that is equipped with the inventive adjustment mechanism or with the inventive adjustment kinematics.

The adjustment kinematics or the adjustment mechanism provide in an exemplary embodiment of the invention that the adjustment of the backrest part can be reversibly transferred in the first step to the seat part, because a forced coupling, which is realized by means of a rocker, is arranged between the backrest part and the seat part.

This transmission of motion by a rocker provides an advantageous and easily implemented measure to transmit a forward or backward folding of the backrest part to the seat part.

In order to achieve the appropriate adjustment kinematics or the appropriate adjustment movement, a side part is formed according to the invention, wherein in a preferred embodiment of the invention, the backrest part is supported on the slide over the side part via a fitting connecting the backrest part with said side part.

The formation or assembly of the side part is a simple and advantageous measure to connect the backrest with the supporting structure of the vehicle seat, that is, with the slide and the seat rail arranged under the slide. The side part thus serves as a constructive component to connect the backrest part to the seat substructure. The side part supports in an advantageous manner the backrest part and the rear portion of the seat part, since the seat part in the rear region is not connected to the seat substructure, since the connection between the seat part and the backrest part is realized by the rocker.

In another embodiment of the invention, a coupling plate can be rotatably disposed on a clutch bearing axis on the side part. This coupling plate causes an unlocking in the first step of the backrest part by means of an unlocking unit by activating an easy-entry unlocking element via a Bowden cable. After unlocking, the backrest part can be brought into the folded position. The coupling plate of the backrest part is guided and secured by means of a fastening element, which engages in a first slotted guide of the backrest-side fitting part. Furthermore, the coupling plate ensures a limiting of the pivotal movement by means of a second fastening element, which engages in a second slotted guide, with respect to the predeterminable pivot angle of the backrest portion, which will be discussed in more detail in the description.

The arrangement of the coupling plate advantageously provides a simple way to transfer movement sequences within the adjustment mechanism.

In addition, in an advantageous manner, a one-piece or multi-piece plunger member can be arranged, which, when it reaches the folding position of the backrest part after the first step, is displaced in such a way by a transmission element arranged at the backrest portion, that the plunger member unlocks a locking element of a slide unlocking unit. Through this unlocking, a top slide can be displaced relative to a base slide in the second step over the first displacement distance, and the vehicle seat/the seat bench is horizontally displaceable.

During this displacement over the first displacement distance, substantially simultaneously a lowering of the seat part takes place. Already by means of these superimposed adjustment movements in the x-direction and y-direction, an enlarged entry space is advantageously created for the entry into the interior of a motor vehicle. To achieve these superimposed adjustments, the seat part near the front region of the seat part was rotatably coupled via the pivoting arms on the seat top rail of the seat rail. The coupling of the seat part in the rear region to the backrest part by means of the rocker has already been explained.

This coupling by means of the rocker makes, as already explained, the transfer of the adjustment movement of the backrest part to the seat part possible in the first step.

Finally, the adjustment mechanism can have an unlocking element that can be arranged in the front region of the seat rail, which engages directly or indirectly in an unlocking lever of a seat rail unlocking unit. Essentially, at the end of the second horizontal adjustment, the top slide abuts with its substantially foremost position on the unlocking element. This technical measure represents a simple and safe unlocking of the seat top rail relative to the seat bottom rail. By the top slide abutting the unlocking element, an activation of the unlocking lever results, thus releasing the seat top rail relative to the seat bottom rail. Since the seat top rail supports the base slide, in the third step the vehicle seat is advantageously displaced relative to the seat top rail, shifting in relation to the seat bottom rail over the second adjustment distance further forward, so that the vehicle seat/the seat bench is again horizontally displaceable in the x-direction.

As a result, an even further enlarged entry space is created for entering into the interior of a motor vehicle in an advantageous manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3-1 shows the vehicle seat in the initial position according to FIG. 1 in a sequence of figures to illustrate the easy-entry adjustment kinematics according to the invention;

FIG. 3-1A shows an associated seat rail and an associated slide in their initial position according to FIGS. 3-1;

FIG. 3-2 shows the vehicle seat with an easy-entry folding of the backrest part according to FIG. 2 in the sequence of figures to illustrate the easy-entry kinematics according to the invention;

FIG. 3-2A shows the associated seat rail and the associated slide in their position according to FIG. 3-2;

FIG. 3-3 shows the vehicle seat after a first adjustment movement of the vehicle seat in the sequence of figures to illustrate the easy-entry kinematics according to the invention;

FIG. 3-3A shows the associated seat rail and the associated slide in their position after the first adjustment movement in accordance with FIG. 3-3;

FIG. 3-4 shows the vehicle seat after a second adjustment movement of the vehicle seat in the sequence of figures to illustrate the easy-entry kinematics according to the invention;

FIG. 3-4A shows the associated seat rail and the associated slide in their position after the second adjustment movement in accordance with FIG. 3-4;

FIG. 4 shows the vehicle seat according to FIG. 1 or FIG. 3-1 in an isometric view;

FIG. 7A shows an enlarged view of the seat rail and the slide in the assembled state in the initial position according to FIG. 3-1A, FIG. 7B shows an enlarged view of a seat bottom rail of the seat rail;

FIG. 7C shows an enlarged view of a seat top rail of the seat rail;

FIG. 7D shows an enlarged representation of a base slide of the slide; and

FIG. 7E shows an enlarged view of a top slide of the slide.

DETAILED DESCRIPTION

Figure 1:
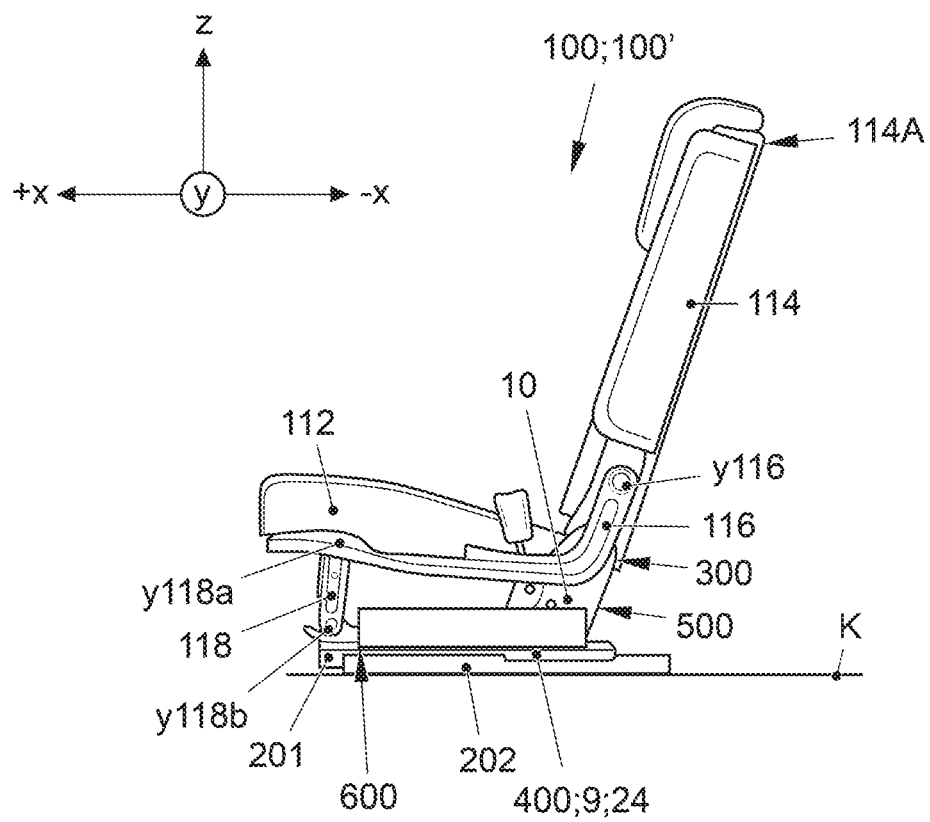
FIG. 1 shows a vehicle seat in a side view in the initial position.

The invention is explained below. For the purposes of the present description, "+x" ("plus x") denotes the normal direction of travel of a vehicle, and "−x" ("minus x") denotes the direction opposite to its normal direction of travel. "y" is the direction in the horizontal, transverse to the x-direction, and "z" is the direction in the vertical, transverse to the x-direction. This terminology of spatial directions in Cartesian coordinates corresponds to the coordinate system commonly used in the automotive industry. Within all the figures below, the same reference numerals are used for the same components, wherein where appropriate, not all the figures again illustrate the components already featured using the reference numerals.

FIG. 1 shows a vehicle seat 100 in a side view. This side view of the vehicle seat 100 also represents a divided or undivided seat bench 100', which may also include or perform the embodiments and functions of the vehicle seat 100 described below.

The explanations below in respect of the vehicle seat 100 can thus be transferred analogously to an undivided seat bench 100' as a whole, or to a multi-part seat bench 100' having a plurality of vehicle seats 100.

The vehicle seat 100 includes a seat part 112 and a backrest part 114.

The backrest part structure of the backrest part 114 is connected via at least one rocker 116 to the seat part structure of the seat part 112.

The at least one rocker 116 is on the one hand rotatably arranged about a swing axis of rotation y116 on the backrest structure of the backrest part 114.

The at least one rocker 116 is on the other hand fixedly attached to the seat part structure of the seat part 112.

The vehicle seat 100 has a fitting, which is part of a rotary table. A fitting part of the fitting is arranged on the backrest part 114. Another fitting part merges into a side part 10 or is connected to the side part 10. The side part 10 is shown in detail only in FIG. 6 and is explained in more detail in connection with the description of this FIG. 6. The side part 10 has no direct connection to the seat part 112.

The backrest-side fitting part can be pivoted relative to the other fitting part, so that the incline adjustment of the backrest part 114 can be performed, relative to the seat part 112. Through the forced coupling of the backrest part 114 to the seat part 112 over the rocker 116, the seat part 112 always moves in conjunction with the adjustment of the backrest part 114.

By activating an adjusting member of the rotary table not further shown and depending on the rotational movement of the adjusting member, the backrest part 114 is rotatably moved forward and backward on the rotary table for adjusting the incline of the backrest part 114, relative to the seat part 112, about the backrest pivot axis y114.

Comfort Setting:

The fitting of the vehicle seat 100 or the seat bench 100' thus enable a comfort setting in which the backrest part 114 of the vehicle seat 100 for adjusting the incline of the backrest part 114 or the seat bench 100' are pivotable by actuating the adjusting member forward in the +x-direction and backward in the −x-direction.

In most cases, stops are provided on the fittings of the fitting of the rotary table which delimit on both sides the adjustment region of the backrest part 114, relative to the seat part 112.

In theory, the rotary tables 116 have an adjustment range of 360°, which however is typically limited by conditions inside the vehicle. Suitably, the adjustment range of the vehicle seat 100 or the seat bench 100' is selected differently in the first row than for a vehicle seat 100 or seat bench 100' in a second or third row of seats situated behind the first row of seats.

In addition, often the adjustment range in the respective row of seats of each backrest part 114 of the vehicle seat 100 or of a seat bench 100' is measured differently forward than the adjustment range backward.

Easy-Entry Adjustment According to the Prior Art

The structure of the fitting basically described enables an easy-entry adjustment movement, in which thus far, a functional unlocking of the fitting components take place, and parallel or immediately following, the unlocking of a top rail 201 relative to a bottom rail 202 also takes place, wherein the backrest part 114 can be folded to a desired position in the direction of the seat part 112, and the vehicle seat 100 folded in such a way, can be moved reversibly forward along the seat rails 200 by the top rail 201 reversibly sliding forward on the bottom rail 202.

The easy-entry setting is typically carried out by actuating an unlocking element 114A, wherein the unlocking element 114A is usually disposed in the upper area of the backrest part 114 because of better accessibility, as shown in the figures.

In the easy-entry function, the vehicle seat 100 or the seat bench 100' slides reversibly forward on the top rail 201 and depending on the version of the easy-entry function in a first or second row of seats, ensures a wider entry into the second or third row seats.

The conventional easy-entry function already makes boarding the second- and/or third-row seats easier for individuals entering the vehicle. The vehicle seat 100 or the seat bench 100' can be moved forward with little effort, or the backrest part 114 can be easily and reversibly folded on to the seat part 112.

New Easy-Entry-Slide-Dive-Down Function:

According to the invention, the described, known kinematics of the easy-entry function are coupled to the kinematics of the dive-down feature described above.

In addition to the coupling of these functions, a further improvement is made which further enlarges the entry area in contrast to the prior art. In short, the improvement is that in a first step, the backrest part 114 of the vehicle seat 100 is folded as in the conventional "easy-entry" function relative to the seat part 112. However, two displacing steps of the vehicle seat 100 reversibly taking place in the +x-direction (driving direction) follow this known step.

Two "slide" displacements of the vehicle seat 100 moving forwards in the travel direction +x-direction now follow, wherein in the first of the two displacement steps, the vehicle seat 100 is lowered analog to the "dive-down" function by a substantially vertical displacement distance Δz1.

The functionality developed according to the invention is realized in particular by an additionally arranged slide 400 on the respective seat rail 200 and further structural and functional changes based thereon. The details will be discussed later.

As a result, the vehicle seat 100 or the seat bench 100' according to the invention is not only moved forward into the known, easy-entry position, but there is a reversible adjustment movement of the vehicle seat 100 overall or of the seat bench 100' in two steps (in a second and a third step) very far forward in the +/−x-direction (further forward in the +x-direction than in the prior art) and downward in the +/−z-direction, whereby advantageously the entry area, and thus access to the interior of the motor vehicle relative to the prior art, becomes more accessible, i.e. more comfortable.

Figure 4:
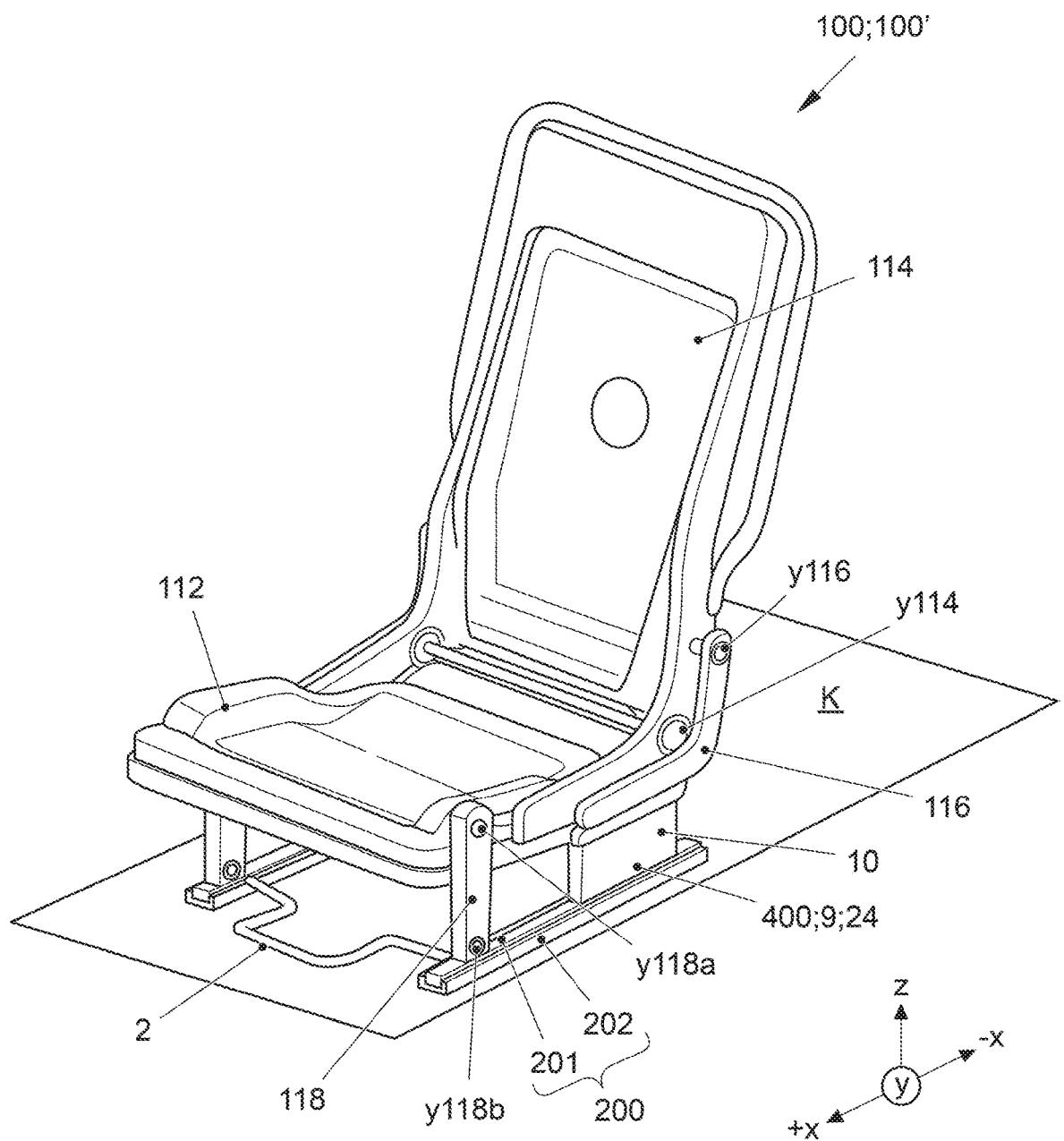

New advantageous adjustment kinematics were developed for implementing the functionality described above, which process is discussed in more detail, in principle with reference to FIGS. 3-1 to 3-4, and with reference to FIGS. 3-1A to 3-4A and FIGS. 4 to 6, wherein at the same time the beneficial effects during the adjustment movement of the vehicle seat 100 or the seat bench 100' are explained.

In order to implement the adjustment kinematics, the vehicle seat 100 or the seat bench 100' are designed as follows:

The seat part 112 has on its front side, which in the normal use position of the vehicle seat 100 sits opposite the backrest part 114, at least one pivoting arm 118, which at one end of the seat part side is rotatably disposed on the seat part structure via a top pivot axis y118a. At the other end, the pivoting arm 118 is rotatably disposed about a bottom pivot axis y118b on a top rail 201 of a seat rail 200, wherein the seat rail 200 comprises a body-fixed bottom rail 202.

In most cases, two pivoting arms 118 are disposed in the y-direction adjacent to each other, in each case near the front or on the front of the seat part 112.

The vehicle seat 100 is disposed on at least one seat rail 200, however, mostly arranged on a seat rail pair 200 having two seat rails longitudinally displaceable in the +/−x-direction.

The seat top rail 201 is movable relative to the seat rail 202, wherein the bottom seat rail 202 is fixedly attached directly to the body K or indirectly to the body K.

The slide 400 is arranged on the seat top rail 201.

Figure 6:
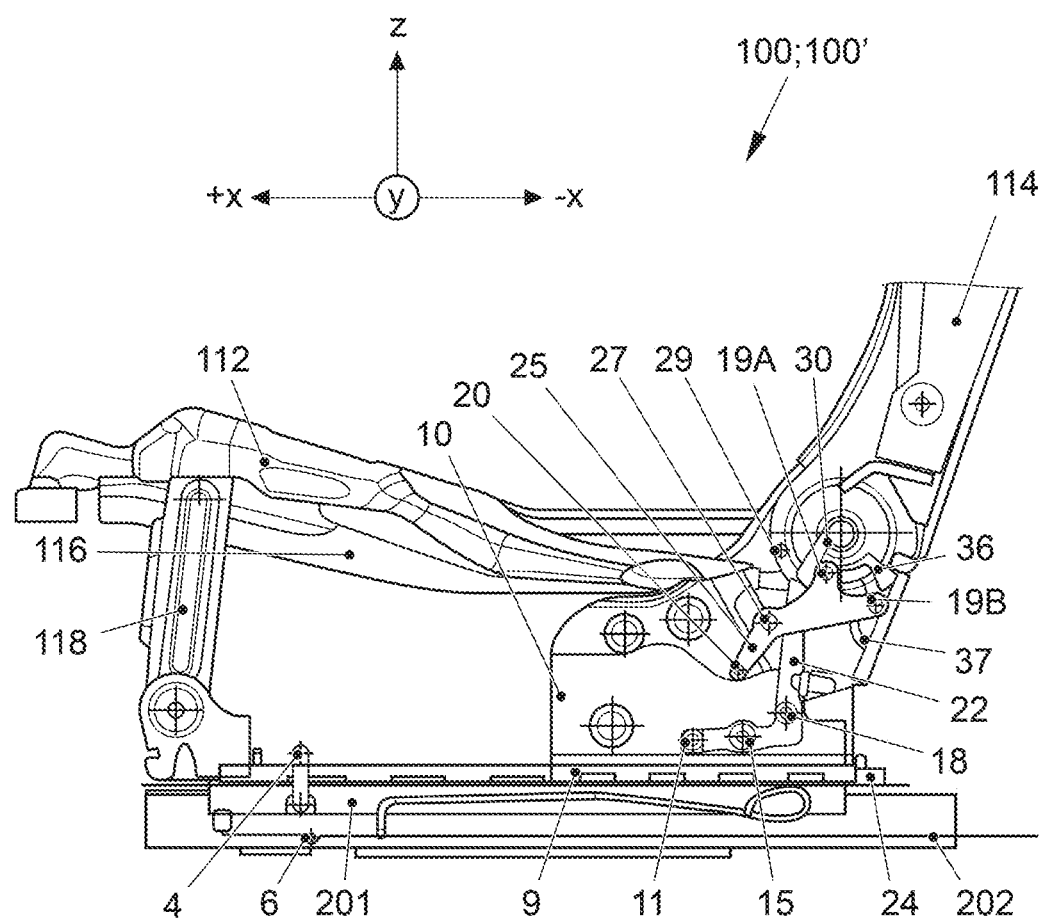
FIG. 6 shows the vehicle seat according to the section A-A according to FIG. 5.

The slide 400 includes a base slide 24 and a top slide 9. These slides 24, 9 are generally shown in FIG. 6 and in more detail in FIGS. 7A to 7E, in connection with the seat top rail 201 and the seat bottom rail 202. The base slide 24 is connected to the top rail 210 of the seat rails 200 mostly arranged on both sides. For each seat top rail 201 of the seat rail pair, in each case a bottom and top slide 24, 9 is arranged.

FIG. 7A shows an enlarged view of the seat rail 200 and of the slide 400 in the assembled state in the initial position according to FIG. 3-1A.

The top slide 9 rests on the base slide 24, wherein it can be seen that the top slide 9 and the base slide 24 are arranged integrated in the seat bottom rail 202.

This has the advantage that the slide 400 is located entirely in the seat bottom rail 202 and the system includes the seat rail 200 and the slide 400 has a low overall height, whereby overall less space is necessary, and in particular the body-side entry area is kept clear.

In addition, the front and rear washers 202C as shown in FIG. 7B are integrated into the seat bottom rail 202. The base slide 24 includes an easy-entry guide in the form of a groove 24B with an insertion opening 24B-1 for a guide element 9E. The base slide 24 is slidably connected with the top slide 9 by means of the guide member 9E in the form of a guide pin, wherein the top slide 9 carries the base slide 24 over the guide pin 9E.

FIG. 7B shows an enlarged view of the seat bottom rail 202. The seat bottom rail 202 further has a downwardly open flanged edge 202B.

The seat bottom rail 202 comprises a rail detent toothing 202A formed in the front inner edge area of the flanged edge 202B. In this area, the second displacement distance Δx2 is realized via a locking element 201A.

FIG. 7C shows an enlarged view of the top seat rail 201. The seat top rail 201 also includes a flanged edge 201B, which however is upwardly open, so that in the assembled state of the seat rail 200 and the slide 400, the edge 201B of the seat top rail 201 engages in the edge 202B of the seat rail 202.

The locking element 201A is seated in the seat top rail 201, wherein the teeth of the locking element 201A are guided in the assembled state through the lateral openings of the seat top rail 201 and engage in the locking position in the rail detent toothing 202A of the seat bottom rail 202.

A movement of the locking element 201A downward causes the teeth of the locking element 201A to disengage from the engagement of the rail detent toothing 202A, so that the second adjustment movement II is made possible.

In this embodiment, different than explained below, an actuating member 201C of the locking element 201A is actuated downward for unlocking. Equally conceivable is an embodiment in which actuation is carried out upwards, as explained differently and generally below. This does not result in any changes to the general principle of the adjustment kinematics.

The top rail 201 has an opening through which the actuating member 201C is accessible.

The actuating member 201C of the unlocking element 201A is flanked by two guide members, which also stand in openings of the seat top rail 201.

FIG. 7D shows an enlarged view of the base slide 24. First, it is clear that the seat top rail 201 is connected to the top rail 201 by means of connecting elements 24C in the manner of rivets. An opening is located between the rivets 24C which allows access to the actuating member 201C and the two flanking guides. In the embodiment, the base slide 24 is inserted in the seat top rail 201 and secured to the seat top rail, in particular riveted by means of the rivets 24C.

The base slide 24 includes a slide detent toothing 24A arranged in the rear side portion of the downwardly open U-shaped base slide 24.

FIG. 7E shows an enlarged view of the top slide 9. The top slide 9 also includes a flanged edge 9B, which is open at the top, so that the edge 9B of the top slide 9 also engages in the edge 202B of the seat bottom rail 202 in the assembled state.

A locking element 9A is situated in the top slide 9, wherein in the assembled state, the teeth of the locking element 9A are guided through the side openings of the top slide 9 by the top and base slides 9, 24 and engage in the locking position in the slide detent toothing 24A of the base slide 24.

The locking element 9A is analogously configured in the same manner as the locking element 201A of the seat top rail 201. However, when viewed in its longitudinal extent, the locking element 9A of the top slide 9 is narrower than the locking element 201A of the seat top rail 20, because the slide 400 is integrated in the seat rail 200.

By moving the locking element 9A downwards, the teeth of the locking element 9A disengage from the engagement of the slide detent toothing 24A, so that the first adjustment movement I is possible.

In this embodiment, a downward actuation on an actuating member 9C of the locking element 201A is performed for unlocking, in a different manner than explained below. An embodiment in which an actuation is carried out upwards is equally conceivable, as also explained in principle differently below. Changes to the general principle of the adjustment kinematics are not characterized.

The top slide 9 has an opening through which the actuating member 9C is accessible. The actuating member 9C of the locking element 201A is also flanked by two guide members, which stand here in openings of the top slide 9.

It becomes clear that the seat top rail 201 with its edge 201B and the top slide 9 with its edge 9B are advantageously guided in a space-saving manner in the same guide plane, at the edge 202B of the seat rail 202.

In other words, the top surface of the seat top rail 201 and the top surface of the top slide 9 sit on a plane, which is flush with the top surface of the seat bottom rail 202, so that in an advantageous manner an only minimally extending arrangement of the slide 400 is created in the seat rail 200.

The smooth guiding of the top slide 9 relative to the seat bottom rail 202 and the seat top rail 201 relative to the seat bottom rail 202 is carried out via so-called ball cages 9D, 201D, which are arranged between the flanged edges 9B, 202B or 201B, 202B.

The pivoting arm 118 is connected with the seat top rail 201 via the connection point with the reference numeral 201E. The side part 10 is connected with the top slide 9 via the connection points with the reference numeral 9E.

In addition, the already mentioned side part 10 is arranged on the top slide 9 in FIG. 6, which as explained, is connected to the fitting of the backrest part 114.

As a result, the side part 10 directly carries the backrest part 114 and indirectly, the rear portion of the seat part 112, since the seat part 112 is forcibly coupled with the backrest part 114 via the rocker 116 which is carrying the seat part 112. In other words, the backrest part 114 is supported via the fitting on the side part 10, while the seat part 112 in the front area is supported via the pivoting arms 118 on the top rail 201, and in the rear area, is rotatably supported via the rocker 116 on the rocker pivot axis y116 on the backrest part 114.

FIG. 3-1 shows the vehicle seat 100 and the seat bench 100' in an initial position.

First step: Adjustment of the vehicle seat 100 from FIG. 3-1 to FIG. 3-2:

First, the folding of the backrest part 114 takes place through the actuation of an unlocking element 114A, wherein said unlocking element 114A, as shown in the figures, is positioned in the upper region of the backrest part 114 because of, in most cases, better accessibility.

In a first step, the backrest part 114 is adjusted forward in the +x-direction, wherein the seat part 112 is entrained in the +x-direction by the rocker 116, which is disposed between the backrest part structure and the seat part structure.

In the first step during the forward-folding of the backrest part 114, the rocker 116 arrangement effects a swing controlled, forcible entrainment of the seat part 112 forwards in the +x direction.

The backrest part 114 is pivoted, as shown, for example by 32°, about an imaginary vertical forwards in the +x-direction. It is understood that other pivot angles can be implemented. With this adjustment of the backrest part 114, the seat part 112 is forcibly moved forward in the +x-direction by means of the forcible coupling of the rocker 116. The seat part 112 is displaced in the first step, via the at least one pivoting arm 118, about the top and bottom pivot axis y118a, y118b, and by a first length forward in the +x-direction. However, a displacement of the entire vehicle seat 100 does not yet occur in this first step.

After performing the first step, a first clearance is already in place in the shoulder area, which in the respective door opening allows for the passing-through of objects into the vehicle interior or out of the vehicle interior.

Figure 2:
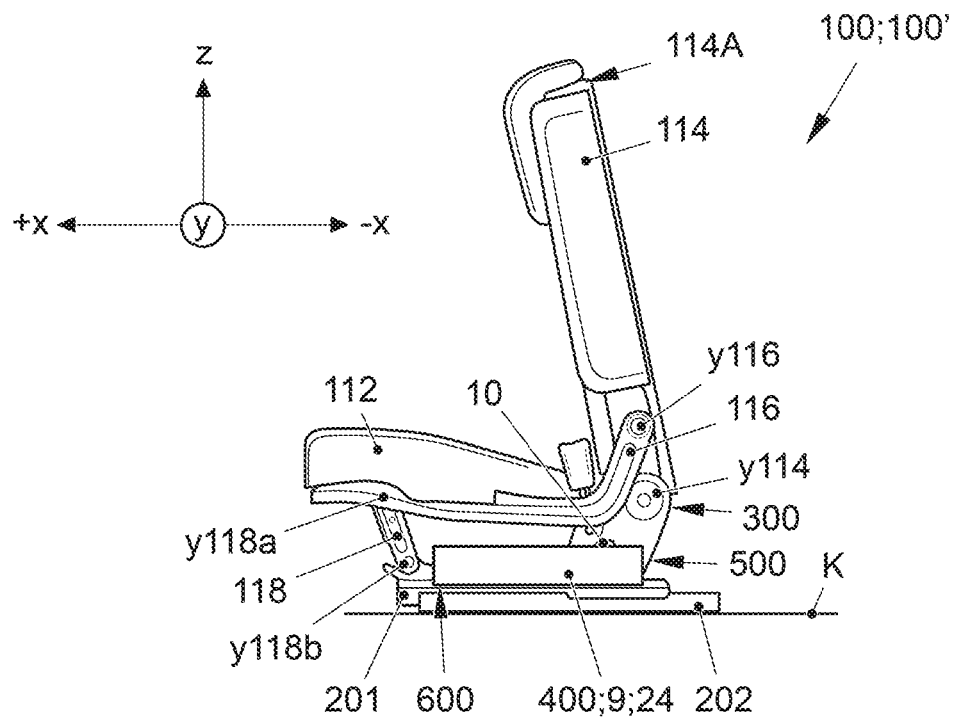
FIG. 2 shows the vehicle seat with an easy-entry folding of the backrest part after a first step within the easy-entry folding.

First step with respect to the associated arrangement of the seat rail 200 and the slide 400, illustrated in FIGS. 3-1A and FIG. 3-2A, when adjusting the vehicle seat 100 from FIG. 3-1 to FIG. 3-2:

In the first step, the seat rail 200 and the slide 400 are in the initial position. No adjustment movement takes place in the region of the seat rail 200 and the slide 400. The top slide 9 and the seat top rail are located in their rearmost position in both FIGS. 3-1A and 3-2A.

Second Step:

Adjustment of the vehicle seat 100 from FIG. 3-2 to FIG. 3-3:

In the second step, the entire vehicle seat 100 now moves forward. The entire vehicle seat 110 hereby moves forward in the +x-direction. The seat part 112 is thereby displaced downward about the at least one pivoting arm 118 via the top and bottom pivot axis y118a, y118b, in the direction of the body K, along the substantially vertical displacement distance 4z1. That is, according to the arrow P1 in FIG. 3-3, the seat part 112 "dives down" simultaneously with the first adjustment movement I of the vehicle seat 100, downwards in the z-direction.

This first adjustment movement I with a parallel lowering of the seat part 112 occurs by the unlocking of the top slide 9 from the base slide 24. The unlocking occurs by means of a slide unlocking unit 500, which is shown in FIG. 6 and will be explained below. That is, the top slide 9 moves forward in the +x-direction via a first adjustment distance Δx1 while maintaining the initial position of the base slide 24, which is seated on the top rail 201 of the seat rail 200.

Second step with respect to the corresponding arrangement of the seat rail 200 and the slide 400, illustrated in the FIGS. 3-2A and 3-3A, when adjusting the vehicle seat 100 of FIG. 3-2 to FIG. 3-3:

In the second step, the seat rail 200 and the slide 400 are in the easy-entry position. The first adjustment movement I of the top slide 9 relative to the base slide 24 has taken place. The unlocking element 9A has been unlocked, so that the teeth of the locking element 9A disengage from the slide detent toothing 24A, so that the top slide 9 relative to the base slide 24 can perform the first adjustment distance Δx1.

Third step: Adjustment of the vehicle seat 100 from FIG. 3-3 to FIG. 3-4:

In the third step, the entire vehicle seat 100 is advanced forward. It is ensured that the top slide 9 unlocks the top rail 201 relative to the base rail 202. The unlocking takes place via a seat rail unlocking unit 600.

This second adjustment movement II in which no further lowering of the seat part 112 takes place downwards in the z-direction, is effected by unlocking of the top rail 201 relative to the bottom rail 202. Since the base slide 24 of the slide 400 sits on the top rail 201 of the seat rail 200, the vehicle seat 100 continues to move further forward in the +x-direction along a second adjustment distance Δx2 by means of the movement of the top rail 201 relative to the bottom rail.

Third step with respect to the corresponding arrangement of the seat rail 200 and the slide 400, illustrated in FIGS. 3-3A and 3-4A, when adjusting the vehicle seat 100 from FIG. 3-3 to FIG. 3-4:

In the third step, the seat rail 200 and the slide 400 are in the easy-entry position. The second adjustment movement II has taken place. The seat top rail 201 connected to the base slide 24 via the connecting elements 24C has been unlocked, so that the second adjustment movement II is possible, in which the seat top rail 201 and the entire slide 400 of top slide and base slide 9, 24 relative to the seat bottom rail 202 can be displaced forward over the second displacement distance Δx2. The locking element 201A was unlocked, so that the teeth of the locking element 201A disengage from the rail detent toothing 202A, so that the seat top rail 201 and the entire slide 400 can carry out the second adjustment distance Δx2 relative to the seat rail 202.

Figure 5:
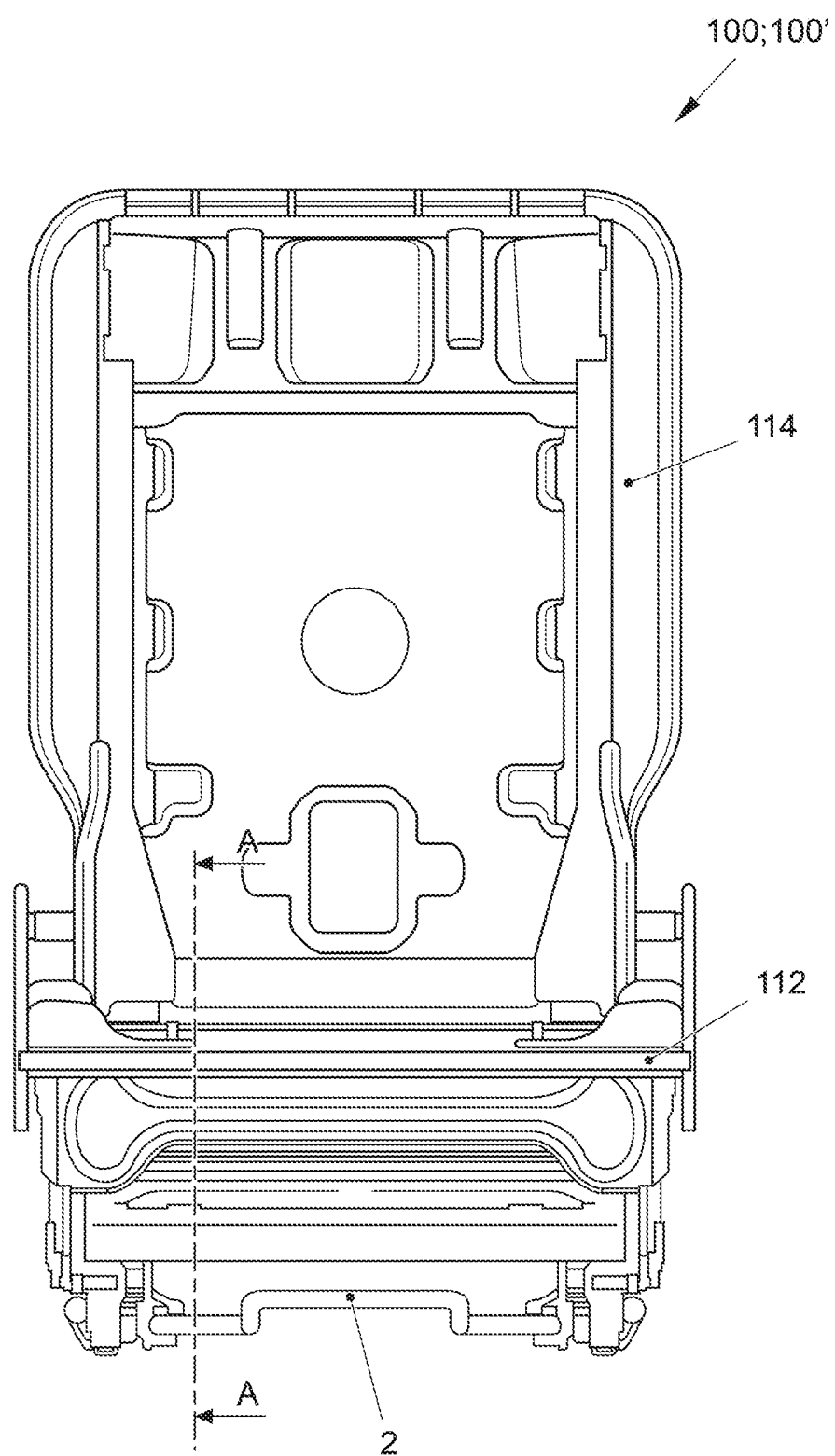
FIG. 5 shows the vehicle seat according to FIG. 1 or FIG. 3-1 in a front view indicating the course of a section A-A.

Further technical details are shown in FIGS. 4 through 6.

FIG. 4 shows an isometric view of the vehicle seat 100 using the same reference numerals for the same components.

FIG. 4 shows for the first time a so-called towel bar 2 of the vehicle seat 100, an unlocking lever which serves to unlock the top rail 201 relative to the bottom rail 202. A movement of the towel bar 2 upward in the z-direction leads to the unlocking of the top rail 201, so that the vehicle seat 100 can be moved reversibly in the x-direction, independent of the easy-entry function.

FIG. 5 shows a front view of the vehicle seat 10 with the same reference numerals for the same components, in order to represent the position of the section A-A, shown as follows in FIG. 6.

The section A-A shows some further technical details of the invention.

In the side part 10, a coupling plate 25 is arranged, rotatably mounted in the side part 10 on a coupling bearing shaft 27 extending in the y-direction. Shown only is the initial position of the coupling plate 25.

The coupling plate 25 has a driving bolt 20 on a bottom first leg, in which a Bowden cable engages, which is not shown. By pulling the Bowden cable, the coupling plate 25 is pivoted in a clockwise direction about the coupling bearing axis 27, as shown in FIG. 6.

The pulling of the Bowden cable is performed when the user actuates the easy-entry unlocking element 114A, illustrated in FIGS. 1 to 3-4.

At a top second leg of the coupling plate 25, a sliding element in the form of a cylindrical pin 19A sits fixedly, which engages in a first slotted guide 36 of a backrest unlocking unit 300 of the fitting of the backrest part 114 and which locks the fitting so that the backrest part 114 cannot be folded.

By pulling the Bowden cable, the coupling plate 25 swivels counterclockwise and the cylinder pin 19A moves out from a not-shown slide recess of the first slotted guide 36, while at the same time, the top second leg of the coupling plate 25 actuates the illustrated unlocking arm 30 of the backrest unlocking unit 300, in particular a round plate unlocking unit, whereby the folding of the backrest part 114 is made possible, because the fitting components of the fitting of the backrest part 114 are now unlocked. During the folding of the backrest part 114, the cylindrical pin 19A is guided in the first slotted guide 36.

On a top third leg of the coupling plate 25, a further cylinder pin 19B is fixedly mounted which engages in a second slotted guide 37 of the side part 10. The exemplary pivot angle of 32° is realized over this second slotted guide 37, that is, the cylinder pin 19B moves back and forth in the second slotted guide 37 during the reversible folding of the backrest part 114, between a top stop and a bottom stop, wherein the bottom stop effects the end position of the backrest part 114 at 32°, relative to the imaginary vertical. It should be noted that the mentioned angle of 32° has been found to be optimal. However, the invention is not limited to this mentioned pivot angle. Rather, depending on the vehicle, other pivot angles can also be defined to allow easy-entry into a second or third row of seats.

As soon as this end position is reached, the first step that has already been explained is completed, and the backrest part 114 and the seat part 112 are in the position shown in FIG. 3-2, starting from the position shown in FIG. 3-1, both of which have already been described.

According to FIG. 6, when folding the backrest part 114, another transmission element 29 moves in the form of a cylindrical pin as a driving element in the counterclockwise direction, and as soon as the backrest part 114 is in the final position of, for example, 32°, exerts a vertical force on a one- or two-piece plunger member 22.

In the embodiment, the plunger member 22 is in two parts and includes a substantially vertical and a substantially horizontal plunger member.

The horizontal plunger member, which is rotatably disposed in the side portion 10 by means of a bearing 18 on a bearing axis extending in the y-direction, acts at one end on the second rocker-like substantially horizontal plunger member, which is likewise rotatably arranged in the side portion 10 by means of a bearing 15 on a bearing axis extending in the y-direction.

The vertical movement of the vertical plunger member directed downward in the z-direction causes the horizontal plunger member to be raised at the end, which is opposite the contact point of the vertical plunger member. The horizontal plunger member thus moves clockwise like a rocker about the bearing axis extending in the y-direction.

A blocking element 11 in the form of a locking bolt arranged there, which locks the top slide 9 relative to the base slide of the slide 400, is raised and the top slide 9 moves forward, as already explained in the second step, in the described first adjustment movement I with a parallel lowering of the seat part 112. The unlocking takes place via the slide unlocking unit 500, which is realized in FIG. 6 as a temporarily arranged locking bolt 11 within the slide 9, 24.

In another embodiment, instead of the locking bolt, a locking and unlocking mechanism 9A, 24A are used, as described in connection with FIGS. 3-1A to 3-4A and FIGS. 7A to 7E. In this case, no lifting of the locking bolt 11 is realized, but instead a lowering of the locking element 9A with respect to the slide detent toothing 24A.

After the unlocking, the top slide 9 moves forward in the +x-direction via a first adjustment distance Δx1 within the first adjustment movement I while maintaining the initial position of the base slide 24, which is connected to the top rail 201 and at least partially on, or, according to the embodiment (FIGS. 3-1A to 3-4A and 7A to 7E), located partly below, the top rail 201 of the seat rail 200.

The locking bolt 11 locks the top slide 9 relative to the base slide 24 in the initial position of the vehicle seat 100, when the vehicle seat 100 returns to the initial position according to FIG. 1 or FIG. 3-1.

Finally, the adjustment mechanism for the implementation of the adjustment kinematics is further characterized by another unlocking element 6 in the form of a further cylindrical pin, which is directly or indirectly connected with the unlocking lever 2, serving for releasing the top rail 201 relative to the bottom rail 202.

Shortly before the top slide 9 of the first adjustment movement I forward in the +x-direction has almost reached its end position, the seat rail unlocking unit 600, which is formed as an unlocking element 6 in the embodiment, is actuated and the second adjustment movement II is made possible. Although there is no further lowering of the seat part 112 downward, the top rail 201 relative to the bottom rail 202 is unlocked, for example, by the lock and unlocking mechanism 201A, 202A and is advanced forward along the displacement distance Δx2.

The unlocking element 6 ensures that the unlocking lever 2 is rotated about its bearing axis 4 extending in the y-direction and is lifted, so that an unlocking of the locking and unlocking mechanism 201A, 202A takes place.

Since the base slide 24 of the slide 400 sits on or under the top rail 201 of the seat rail 200 and is fixedly connected to the top rail 201, the entire vehicle seat 100 moves further forward in the +x-direction along a second adjustment distance Δx2 by means of the top rail 201 movement relative to the bottom rail 202.

From this foremost adjustment position of the vehicle seat 100, after the vehicle seat 100 has been moved along both adjustment distances Δx1 and Δx2, according to FIG. 1 and FIG. 3-1, FIG. 3-1A, the vehicle seat 100 can be moved back to its original initial position, subject to the appropriate resetting of the adjustment mechanism components.

Advantageously, according to the invention the vehicle seat 100 or the seat bench 100' are not only moved forward into the known easy-entry position. Also, a reversible movement of the vehicle seat 100 or the seat bench 100' takes place in two steps (two adjustments Δx1+Δx2), very far forward in the +/−x-direction and during the first adjustment movement I. A lowering movement of the seat part 112 and the backrest part 114 along the vertical displacement distance Δz1 downwards in the +/−z-direction also takes place, whereby advantageously the entry area is larger due to the "easy-entry-slide-dive-down" kinematics and thus, the accessibility to the interior to the second or third row of seats is significantly improved.

What is claimed is:

1. An adjustment method of a vehicle seat to facilitate entry into an interior of a motor vehicle, the method comprising:

in a first step, a backrest part of the vehicle seat is unlocked and is brought relative to the seat part of the vehicle seat into a predeterminable folded position, moving closer to the seat part, in a second step, a first adjustment movement of the vehicle seat is performed in which the vehicle seat is horizontally displaced a first adjustment distance and the seat part is moved vertically downwards a predeterminable vertical adjustment distance, in a third step after the first adjustment movement, the vehicle seat is horizontally advanced a second adjusting distance in a second adjustment movement, wherein, in the second step, the vehicle seat is horizontally displaced simultaneously as the seat part is moved vertically downwards, wherein the vehicle seat is displaced the first adjustment distance along a slide, the slide having a top slide disposed on a base slide, the top slide being movable relative to the base slide, wherein the slide is provided in a seat rail, the seat rail having a seat top rail and a seat bottom rail, and wherein the seat top rail and the top slide are slidably supported relative to each other in the seat bottom rail, wherein a top-most surface of the seat top rail and a top-most surface of the top slide are co-planar.

2. The adjustment method according to claim 1, wherein the adjustment of the backrest part in the first step is reversibly directly transmitted to the seat part since the backrest part is forcibly coupled to the seat part.

3. The adjustment method according to claim 1, wherein a coupling plate is rotatably arranged on a side part on a coupling bearing axis, the coupling plate triggering in the first step an unlocking of the backrest part via the backrest unlocking unit by actuating an easy-entry unlocking element via a Bowden cable so that the backrest part is brought into the folded position, and wherein the coupling plate of the backrest part is guided and secured by a first sliding element provided at one leg of the coupling plate, the first sliding element engages in a first slotted guide of the backrest part and the coupling plate provides a limitation with respect to the predeterminable pivot angle of the backrest part by a second sliding element provided on another leg of the coupling plate, the second sliding element engages in a second slotted guide of the backrest part.

4. An adjustment method of a vehicle seat to facilitate entry into an interior of a motor vehicle, the method comprising:

in a first step, a backrest part of the vehicle seat is unlocked and is brought relative to the seat part of the vehicle seat into a predeterminable folded position, moving closer to the seat part, in a second step, a first adjustment movement of the vehicle seat is performed in which the vehicle seat is horizontally displaced a first adjustment distance and the seat part is moved vertically downwards a predeterminable vertical adjustment distance, in a third step after the first adjustment movement, the vehicle seat is horizontally advanced a second adjusting distance in a second adjustment movement, wherein, in the second step, the vehicle seat is horizontally displaced simultaneously as the seat part is moved vertically downwards, wherein the backrest part is supported via a fitting connecting to a side part, wherein the side part is provided over a slide, the slide having a top slide and a base slide, wherein on the side part, a one-piece or multi-piece plunger element is arranged, which when reaching the folded position of the backrest part after the first step, is displaced by a transmission element arranged at the backrest part, wherein the plunger element unlocks a locking element of a slide unlocking unit, and wherein the top slide relative to the base slide in the second step is movable along the first adjustment distance and the vehicle seat is horizontally displaceable.

5. An adjustment method of a vehicle seat to facilitate entry into an interior of a motor vehicle, the method comprising:

in a first step, a backrest part of the vehicle seat is unlocked and is brought relative to the seat part of the vehicle seat into a predeterminable folded position, moving closer to the seat part, in a second step, a first adjustment movement of the vehicle seat is performed in which the vehicle seat is horizontally displaced a first adjustment distance and the seat part is moved vertically downwards a predeterminable vertical adjustment distance, in a third step after the first adjustment movement, the vehicle seat is horizontally advanced a second adjusting distance in a second adjustment movement, wherein, in the second step, the vehicle seat is horizontally displaced simultaneously as the seat part is moved vertically downwards, wherein the backrest part is supported via a fitting connecting to a side part, wherein the side part is provided over a slide, wherein the slide has a top slide and a base slide, wherein an unlocking element is disposed in the front region of a seat rail, which engages indirectly or directly in an unlocking lever of a seat rail unlocking unit, wherein the top slide substantially abuts on the unlocking element at an end of the second adjustment movement, and by actuating the unlocking lever, causes an unlocking of a seat top rail relative to a seat bottom rail so that the seat top rail, which is secured to the base slide, is movable in relation to the seat bottom rail of the seat rail in the third step along the second adjustment distance, and the vehicle seat is further horizontally displaceable.

* * * * *